(12) United States Patent
Bell

(10) Patent No.: X4134
(45) Date of Patent: Jun. 1, 1825

(54) SPINNING THREAD, OF WOOL

(76) Inventor: William Bell

William Bell

Letters Patent.

The Schedule referred to in these Letters Patent and making part of the same containing a description in the words of the said William Bell himself of his improvement being a machine for making thread of wood for making Hats, Window blinds, Table covers, &c..

My improvement consists in making a frame of any suitable length and breadth, similar to a Carpenter's common plane in form. At the front end of this frame or block part of this machine is a mortice for the insertion of a square or oblong block of wood or metal for the purpose of holding [illegible] teeth resembling what is commonly called a "flam" or horse lancet. They are kept tight by screws screwed into the side of the block touching their sides. The square or oblong block of wood or metal which contains them is let into the face of the block part of this machine and screwed to secure its firmness. At a suitable distance from the teeth which split the wood one way there is a piece of metal angular or square fastened down into the block by countersunk screws to secure it in its place. Half of the inside [illegible] of the upper plate is bevelled off to correspond with a sliding knife or splitter similar to a common plane iron, for the purpose of splitting the wood in a direction contrary to what the teeth split it, so as to form the wood into threads. The third plate lies on the upper part of the second piece of metal which has an inclined plane for the purpose of raising or depressing the knife or cutter for cutting coarse or fine, and has a screw let into it which passes through the third plate in an oblong mortise, likewise for regulating the size of the splits. A fourth plate with its under edge corresponding to the cutter is screwed on the face of the block covering half the width of the knife for making it secure. The block or frame part of this machine is hollow half of its length for the purpose of admitting and letting out the splints or threads of wood. On the side of this machine is put a piece of wood projecting in towards the centre of the block on the bottom of the same, for a way or director to this machine when on the piece of wood in operation. It is operated on by hand. The plank from which the splints or threads of wood is to be taken can be in an inclined or horizontal direction.

Witnesses { [illegible] McIntire
[illegible] Elliot

William Bell.

DRAFTSMAN'S DIVISION.

*All communications should be addressed to*
"The Commissioner of Patents,
Washington, D. C."

2—328 a.

*DEPARTMENT OF THE INTERIOR,*

United States Patent Office,

*Washington, D. C.,* ............, 189...

*SIR:*

*The printed* copies ............ *of Patent No.* W. Bell, June 1, 1825 are *exhausted.*

*As soon as printed a copy will be mailed you to complete your order.*

*By direction of the Commissioner:*

*Very respectfully,*

*Chief Clerk.*

8143b6-97-5m